United States Patent [19]

Robertson

[11] Patent Number: 5,230,649
[45] Date of Patent: Jul. 27, 1993

[54] DUCK CALL APPARATUS

[76] Inventor: Phil A. Robertson, 538 Mouth of Cypress Rd., West Monroe, La. 71292

[21] Appl. No.: 715,427

[22] Filed: Jun. 14, 1991

[51] Int. Cl.$^5$ .............................................. A63H 5/00
[52] U.S. Cl. ...................................... 446/204; 84/330
[58] Field of Search ............... 446/202, 203, 204, 206, 446/207, 208, 209; 116/137 R; 84/384, 330

[56] References Cited

U.S. PATENT DOCUMENTS

| | | |
|---|---|---|
| 33,437 | 10/1861 | Lamb . |
| 408,539 | 8/1889 | Russell ................... 446/204 |
| 874,526 | 12/1907 | McLaughlin et al. ............. 446/203 |
| 993,454 | 5/1911 | Merrick . |
| 1,278,095 | 9/1918 | Beckwith . |
| 2,927,399 | 3/1960 | Bacon ................... 446/205 X |
| 3,011,382 | 12/1961 | Kim ..................... 84/384 |
| 3,029,554 | 4/1962 | Mobley . |
| 3,066,443 | 12/1962 | Mobley . |
| 4,940,451 | 7/1990 | Leady . |

FOREIGN PATENT DOCUMENTS 510626  3/1955  Canada ........................... 446/204

Primary Examiner—Mickey Yu
Attorney, Agent, or Firm—Hubbard, Thurman, Tucker & Harris

[57] ABSTRACT

A two-piece duck caller device simulates the call of the mallard drake using a sounding body and a resonance chamber encompassing the sounding body. The sounding body includes an elongated blowing stem, a whistle portion with an air vent and a flared exhaust portion. The resonance chamber is a hollow tube of sufficient diameter to encompass the sounding body with the end of the blowing stem protruding from one end of the resonance chamber and the flared exhaust end protruding from the other end of the resonance chamber. The resonance chamber has an air vent aligned with the air vent of the sounding body in the assembled duck caller.

18 Claims, 2 Drawing Sheets

DUCK CALL APPARATUS

BACKGROUND OF THE INVENTION

This invention relates to a duck calling device, and in particular to a duck calling device capable of simulating duck calls by blowing through the device.

Many duck call devices have been developed for use by duck hunters to attract wild ducks. Almost all call devices have been made to simulate the hen or female duck which emits a quacking sound. This sound has been simulated by numerous duck calls, most of which utilize a single reed, or multiple reed system of some sort.

In contrast to the sound emitted by the mallard hen, the mallard drake (male duck) emits a buzz or hissing sound which is much more difficult to simulate. Various attempts have been made to simulate the call of the mallard drake but have been unsuccessful.

Consequently, there exists a need to develop an effective and accurate calling device for simulating the call of the mallard drake. A need also exists for a duck caller device which is dependable under any weather conditions with simplicity of construction having a minimum of maintenance and assembly requirements.

BRIEF SUMMARY OF INVENTION

A principal object of this invention is to provide a duck call device of novel construction and configuration to produce the sound of the male mallard duck. Another object of this invention is to provide a duck call device which can utilize variations in air flow applied by the user blowing into the device to simulate the sounds of several other species of ducks.

Another object of this invention is to provide a duck caller having a unique relationship and configuration of a whistle-like sounding body encased in a resonance chamber.

A further object of this invention is to provide a duck caller simulating the call of a mallard drake that is dependable under any weather conditions in the field, with no disassembly, no reeds, and ease in blowing.

These objects are accomplished in the duck call device of the present invention comprising a one-piece or two-piece assembly which simulates the call of the mallard drake. One piece of the assembly is an elongated cylindrical sounding body having a blowing stem at one end and a whistle portion at the other with an air vent therein. The other piece is a resonating chamber for encompassing the sounding body having an air vent positioned to coincide with the air vent of the whistle portion of the sounding body. The blowing stem of the sounding body extends from one end of the resonating chamber for access by the user.

The sounding body piece may be used by itself or assembled with the resonating chamber to provide the desired effect.

The novel features and construction of the invention as well as additional objects thereof will be understood more fully from the following description when read in connection with the accompanying drawings.

DESCRIPTION OF PREFERRED EMBODIMENT

Figure 1:
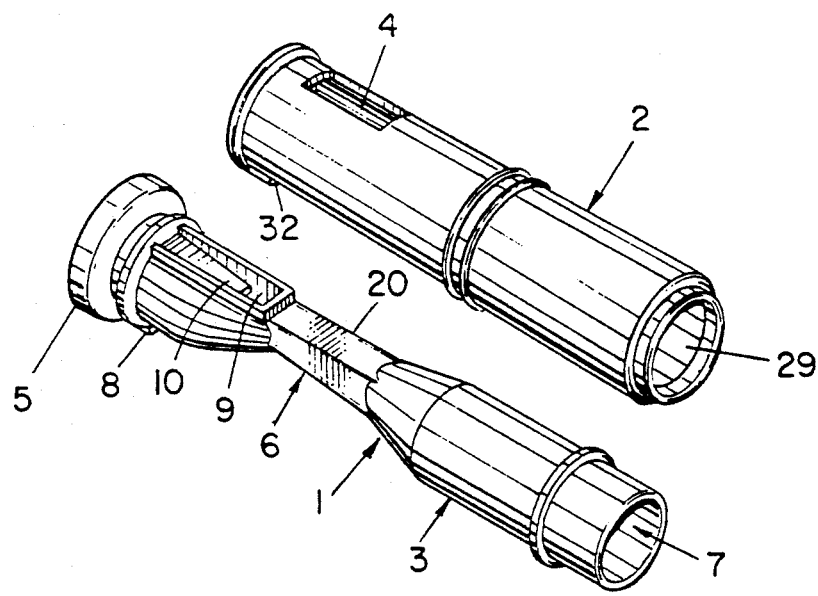
FIG. 1 is a prespective view of the disassembled duck call device of the present invention showing the sounding body and resonance chamber.

Referring now specifically to the drawings, a preferred embodiment is depicted therein. FIG. 1 shows a two-piece disassembled duck caller apparatus with a sounding body 1 and a resonance chamber 2. The sounding body has a blowing stem 3 at one end and a flared exhaust section 5 at the other end. A whistle section 6 is located in the sounding body near the flared end and having an air vent 9 therein. The resonance chamber 2 comprises a cylindrical tube having a diameter greater than that of sounding body 1. The chamber has an air vent 4 near one end.

Figure 2:
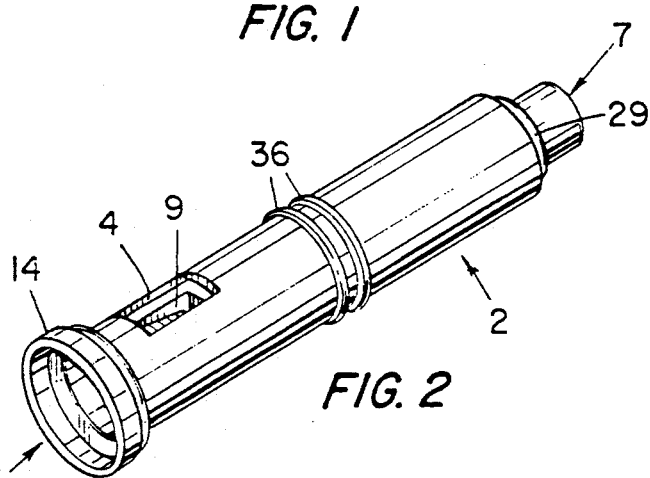
FIG. 2 is a perspective view of the preferred embodiment of the duck caller show in FIG. 1 in assembled form.

FIG. 2 shows the two-piece duck caller apparatus in assembled form with resonance chamber 2 encompassing sounding body 1. The length of sounding body 2 is slightly longer than resonance chamber 2 so that blowing stem 3 extends beyond the end of resonance chamber 2. In assembled position, the air vent 4 of resonance chamber 2 is positioned directly over air vent 9 of sounding body 1.

Figure 3:
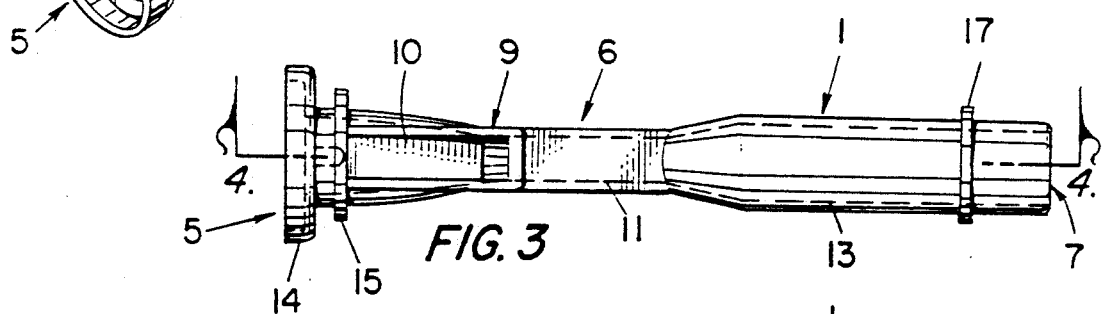
FIG. 3 is a top view of the sounding body piece of the duck caller shown in FIG. 1.

Looking now at FIG. 3, the sounding body 1 is shown in greater detail. The cylindrical blowing stem 3 includes a blowing end 7 at the end of the sounding body. Adjacent to the blowing stem is a whistle section 6 comprising a tapered rectangular hollow tube having a rectangular tubular opening 11 therein extending from blowing stem 3 to an air vent 9. At the exhaust end of the sounding body 1 is flared end 5, including a fluted cylindrical piece 14. A stabilizing ring 15 is located near fluted piece 14 and another stabilizer ring 17 is located near the end 7 of blowing stem 3. A rectangular groove 10 extends from fluted piece 14 to air vent 9.

Figure 4:
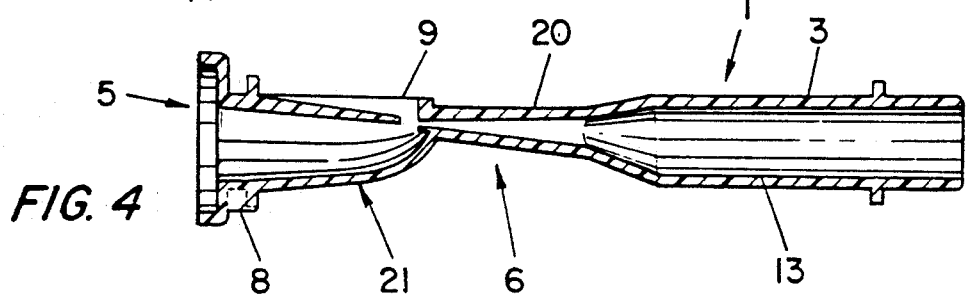
FIG. 4 is a cross-sectional side view of the sounding body shown in FIG. 3 taken along line 4—4.

In FIG. 4 a side view of sounding body 1 is shown. Blowing stem 3 is an elongated hollow tube having an inner cylindrical wall 13 which diminishes in radius from blowing end 7 to the whistle section 6. The whistle section 6 of sounding body 1 is substantially tapered and rectangular in shape and has a flattened portion 20 along the top with the air vent 9 therein. The tubular opening 11 tapers down from the cylindrical radius of the blowing stem 3 to a thin rectangular opening at air vent 9. A sounding chamber 21 connects to whistle section 6 and flares into a larger curved radius ending at the flared end 5. An alignment piece 8 extends between fluted piece 14 and stabilizing ring 15.

Figure 6:
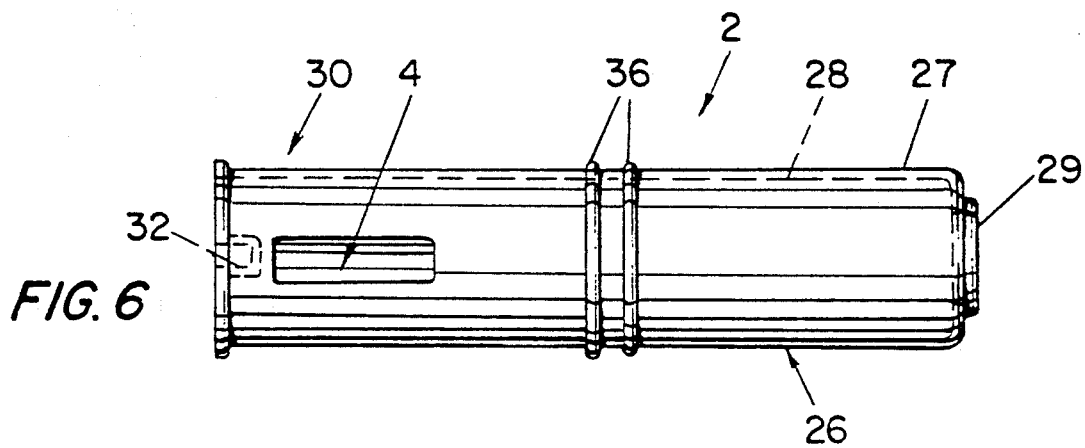
FIG. 6 is a top view of the resonance chamber piece of the duck caller device shown in FIG. 1.
Figure 7:
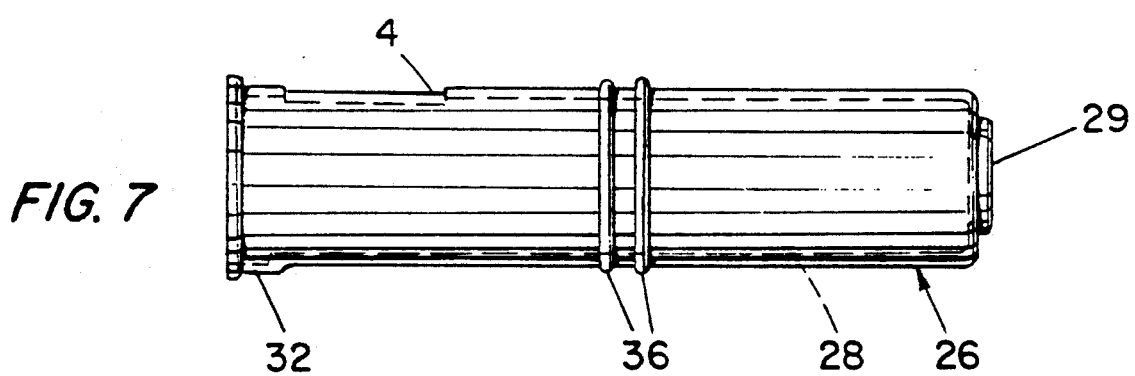
FIG. 7 is a side view of the resonance chamber shown in FIG. 6.

With reference now to FIGS. 6 and 7, the resonance chamber 2 is shown in greater detail. Chamber 2 is preferably a hollow cylindrical tube having a constant outer diameter 27 and an inner diameter which is slightly flared from one end 26 for encompassing the blowing stem of sounding body 1 to the other end 30 for encompassing the exhaust end of sounding body 1.

The air vent 4 is located in the top of resonance chamber 2 near flared end section 5. Two annular rings 36 are disposed adjacent to each other about the periphery of resonance chamber 2 to be used as a lanyard to accommodate an attachment piece for wearing the call device around the neck or elsewhere.

A restricted annular opening 29 is provided in the end 26 of the resonance chamber 2. An alignment key 32 is positioned in chamber 2 at the end opposite opening 29 to accomodate the alignment piece 8 of sounding body 1.

Sounding body 1 and resonance chamber 2 are preferably made of wood or plastic, although metal may be used depending upon the amount and type of resonance in vibration desired. Sounding body 1 is preferably solvent welded onto the fluted exhaust piece 14.

Figure 5:
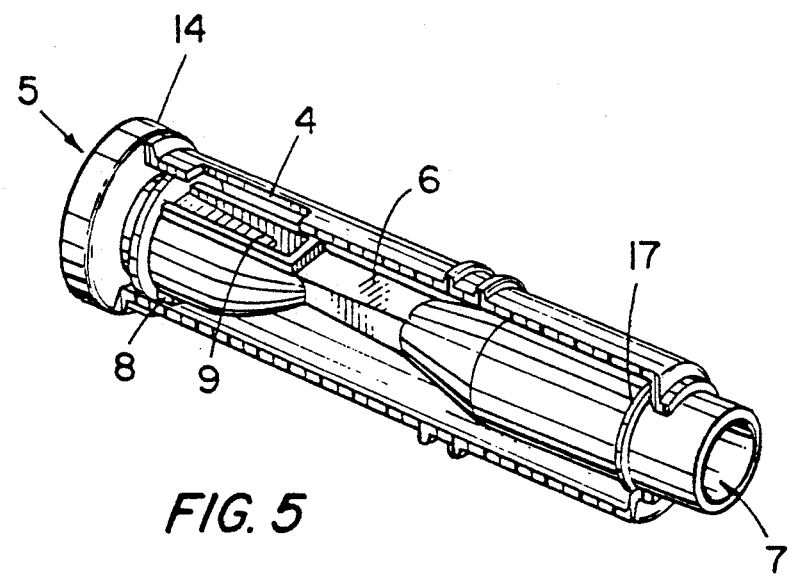
FIG. 5 is a perspective view of the assembled duck caller of FIG. 2 with the resonance chamber partially cut away.

FIG. 5 shows a perspective cutaway view of the assembled duck call device. Sounding body 1 is preferably set coaxially within the resonance chamber 2. The alignment key 8 is inserted into alignment channel 32 which insures that the air vent 9 of the sounding body will be aligned with air vent 4 of the resonance chamber. Stabilizing ring 15 is solvent welded within resonance chamber 2. Also, the end of chamber 2 may be solvent welded to fluted piece 14. Blowing stem 3 with stabilizer ring 17 are friction fitted within blowing stem opening 29 of the resonance chamber 2 so that no air can escape from the blowing stem and from the resonance chamber. Thus air is emitted only through flared end 5 and through air vents 9 and 4 as shown. When assembled, the end of blowing stem 7 extends beyond the end of opening 29 in the resonance chamber.

By way of example, a preferred embodiment of the duck call device as described above may have the following dimensions. The length of the sounding body is 4.875 inches long. The blowing stem portion 3 is 2.625 inches long. The flattened portion 20 of the sounding body is 1.125 inches long. The inside diameter of the exhaust end 5 is 0.500 inches and the fluted end 14 is 1.250 inches in diameter. The inside diameter of the blowing stem portion is 0.500 inches. The air vent in the sounding body is 0.190 inches by 0.300 inches and the recession groove in front of the air vent is 0.930 inches long.

The resonance chamber 2 is 4.875 inches long, having an internal diameter of 0.932 inches. The air vent of the resonance chamber is 1.0 inches long by 0.300 inches wide. When the sounding body and the resonance chamber are assembled the end of the blowing stem protrudes from the resonance chamber by about 0.375 inches. The fluted exhaust end 14 protrudes from the other end of the resonance chamber 200 inches.

Although the duck call apparatus is shown in a preferred embodiment as a two-piece assembly, it is understood that the hollow sounding body may be used without the resonance chamber and still produce a desirable effect. The resonance chamber enhances the call and provides protection for the sounding body.

The duck caller device as described herein provides for controlled air flow to simulate perfectly the call of the mallard drake. The sound emitted from this duck call can be varied by skilled use of the device to simulate other species calls as well by simply adjusting air flow from the mouth of the user. The calls which can be simulated include the Pintail drake and hen, the American Widgeon drake and hen, the Greenwinged teal drake and hen, and the Wood duck drake and hen. No adjustment or disassembly of the caller device is needed.

While the preferred embodiment of the invention has been illustrated and described, those skilled in the art can easily make changes without departing from the spirit and scope of the invention.

What is claimed is:

1. Duck call apparatus comprising a hollow sounding body having a blowing stem, a whistle portion and an exhaust portion; and an open-ended hollow resonance chamber encompassing the sounding body with one end of the blowing stem accessed from one end of the chamber and the exhaust portion of the sounding body disposed at the other open end of the resonance chamber, the interior of the hollow resonance chamber being open to air flow therein along substantially its entire length.

2. The duck caller apparatus of claim 1 wherein the whistle portion of the sounding body has a first air vent therein and the resonance chamber has a second air vent substantially aligned with said first air vent.

3. The duck caller apparatus of claim 2 wherein the sounding body is air sealed within the resonance chamber to restrict air coming through the blowing stem to flow only through the first and second air vents of the sounding body and the resonance chamber respectively, and through the exhaust portion of the sounding body.

4. The duck caller apparatus of claim 2 wherein the sounding body has an alignment element and the resonance chamber has an alignment key for accepting the alignment element to align the air vent of the sounding body with the air vent of the resonance chamber.

5. Duck call apparatus comprising a hollow sounding body including:
(a) a hollow cylindrical blowing stem,
(b) a hollow member having a tapered rectangular air passage in communication with said blowing stem,
(c) an air vent in communication with said air passage,
(d) a sounding chamber in communication with said air passage,
(e) an output section in communication with said sounding chamber, and
(f) an open-ended resonance chamber surrounding the periphery of said sounding body and having an air vent therein, disposed adjacent to the air vent of the sounding body.

6. The duck call apparatus of claim 5 and further comprising a first ring about the outer periphery of the blowing stem of the sounding body and in contact with the inner surface of the resonance chamber to provide an air flow seal.

7. The duck call apparatus of claim 6 and further comprising a second ring about the outer periphery of the sounding chamber and in contact with the inner surface of the resonance chamber to provide an air flow seal.

8. Duck call apparatus comprising a hollow sounding body having an air passageway extending therethrough, including a hollow cylindrical blowing tube section, a tapered hollow rectangular section adjacent to the blowing tube section having an air-passageway therethrough, a hollow output section adjacent to the whistle section and an open cylindrical resonance chamber surrounding the periphery of the hollow sounding body.

9. The duck call apparatus of claim 8 wherein the resonance chamber has an air vent therein disposed adjacent to the air vent in the sounding body.

10. The duck call apparatus of claim 9 wherein said sounding body is air-sealed within said resonance chamber so that air entering the blowing stem can exit only through the output section and through the air vent of the sounding body.

11. Duck call apparatus comprising a hollow sounding body having a blowing stem, a whistle portion and an exhaust portion; and an open-ended hollow resonance chamber encompassing the sounding body with one end of the blowing stem accessed from one end of the chamber and the exhaust portion of the sounding body disposed at the other open end of the resonance chamber, wherein the whistle portion of the sounding body has a first air vent therein and the resonance chamber has a second air vent substantially aligned with said first air vent.

12. The duck caller apparatus of claim 11 wherein the sounding body is air sealed within the resonance chamber to restrict air coming through the blowing stem to flow only through the first and second air vents of the sounding body and the resonance chamber respectively, and through the exhaust portion of the sounding body.

13. The duck caller apparatus of claim 11 wherein the sounding body has an alignment element and the resonance chamber has an alignment key for accepting the alignment element to align the air vent of the sounding body with the air vent of the resonance chamber.

14. Duck call apparatus comprising:
a hollow sounding body including (a) a hollow cylindrical blowing stem, (b) a hollow rectangular member having an air passage in communication with said blowing stem, (c) an air vent in communication with said air passage, (d) a sounding chamber in communication with said air passage, and (e) an output section in communication with said sounding chambers; and an open-ended resonance chamber surrounding the periphery of said sounding body and having an air vent therein, disposed adjacent to the air vent of the sounding body.

15. The duck call apparatus of claim 14 and further comprising a first ring about the outer periphery of the blowing stem of the sounding body and in contact with the inner surface of the resonance chamber to provide an air flow seal.

16. The duck call apparatus of claim 15 and further comprising a second ring about the outer periphery of the sounding chamber and in contact with the inner surface of the resonance chamber to provide an air flow seal.

17. Duck call apparatus comprising a hollow sounding body having an air passageway extending therethrough, including a hollow cylindrical blowing tube section, a hollow whistle section adjacent to the blowing tube section having an air vent therein, and a hollow output section adjacent to the whistle section, wherein said whistle section is a tapered hollow rectangular section having an air-passageway therethrough, and further comprising an open ended cylindrical resonance chamber surrounding the periphery of the hollow sounding body wherein the resonance chamber has an air vent therein disposed adjacent to the air vent in the sounding body.

18. The duck call apparatus of claim 17 wherein said sounding body is air-sealed within said resonance chamber so that air entering the blowing stem can exit only through the output section and through the air vent or the sounding body.

* * * * *

UNITED STATES PATENT AND TRADEMARK OFFICE
CERTIFICATE OF CORRECTION

PATENT NO. : 5,230,649
DATED : July 27, 1993
INVENTOR(S) : Phil A. Robertson

It is certified that error appears in the above-indentified patent and that said Letters Patent is hereby corrected as shown below:

Column 3, line 48, "200" should be --.200--.

Signed and Sealed this

Twelfth Day of April, 1994

Attest:

BRUCE LEHMAN

Attesting Officer

Commissioner of Patents and Trademarks